United States Patent Office
2,702,817
Patented Feb. 22, 1955

2,702,817

PROCESS FOR THE SEPARATION OF ISO-PHTHALIC AND TEREPHTHALIC DIESTERS

Manuel A. Pino, Richmond, Calif., assignor to California Research Corporation, San Francisco, Calif., a corporation of Delaware No Drawing. Application October 1, 1953,
Serial No. 383,706

7 Claims. (Cl. 260—475)

This invention relates to a new and useful method of separating isomeric mixtures of organic compounds. More particularly, it relates to a process of separating lower aliphatic alcohol di-esters of isophthalic acid and terephthalic acid mixtures by dual solvent extraction.

In the production of organic compounds such as aromatic carboxylic acids of the types including toluic acids, phthalic acids, pyromellitic acids, mellitic acids, etc., isomeric mixtures are commonly formed. Such mixtures are very difficult if not impossible to separate by ordinary means such as fractional distillation, crystallization, etc. due to their close boiling ranges, high melting points, and other physical characteristics.

Isophthalic acid and terephthalic acid are examples of the particular aromatic carboxylic acids of the foregoing type with which this invention is concerned. They are commonly prepared by methods which result in mixed products containing isophthalic acid and terephthalic acid as in the case where an isomeric mixture of meta- and para-xylene is subjected to oxidation. These acid mixtures are practically impossible to separate by conventional methods such as fractional distillation, since isophthalic acid has a tendency to sublime and terephthalic acid has such a high melting point there is always danger of thermal decomposition. When isomeric mixtures of isophthalic acid and terephthalic acid are esterified with lower aliphatic alcohols, lower melting mixtures of di-esters are formed which can be liquefied and subjected to distillation. However, the boiling points of these isophthalates and terephthalates are so close that the compounds cannot be separated by fractional distillation.

I have now discovered that lower aliphatic alcohol di-esters of isophthalic and terephthalic acid mixtures can be conveniently separated by a novel dual solvent extraction process. In this process the mixture of isophthalate and terephthalate is first contacted with a solvent characterized by a relatively high solubility ratio for isophthalate and terephthalate. The expression "high solubility ratio" is used in the sense that it denotes the solvent's capacity to dissolve a much larger amount of isophthalate than terephthalate. An amount of solvent is employed which is just sufficient to entirely dissolve the more highly soluble isophthalate contained in a given mixture. This extraction leaves an excess of undissolved terephthalate isomer because of its lower solubility. The undissolved terephthalate may then be withdrawn from the process in a nearly pure state.

The solvent is then removed from the solution of isophthalate and terephthalate and the mixture thus obtained, rich in the more highly soluble isophthalate, is contacted with another solvent having a relatively lower solubility ratio for the isophthalate and terephthalate than the initial solvent, the amount of solvent in this case being just sufficient to entirely dissolve the less soluble terephthalate. In this extraction excess isophthalate remains undissolved and is withdrawn in a substantially pure form. The solvent may then be removed from the extract containing the low ratio of isophthalate and terephthalate and the residual solid mixture recycled either alone or with fresh stock to repeat the dual solvent extraction in the foregoing sequence.

As an illustration of the foregoing process in more specific terms, a mixture of isophthalate and terephthalate consisting of about 72 parts of dimethyl isophthalate to 28 parts of dimethyl terephthalate is contacted with a solvent having a high solubility ratio for the esters of, for example, 18 parts isophthalate to 1 part terephthalate. Just enough solvent is employed to entirely dissolve the dimethyl isophthalate, while at the same time dissolving $^{72}/_{18}$ or 4 parts of dimethyl terephthalate. This leaves 28 minus 4, or 24 parts of essentially pure dimethyl terephthalate undissolved, which is widthdrawn from the process. The solvent is next removed from the solution containing 72 parts of dimethyl isophthalate and 4 parts dimethyl terephthalate and the resultant solid mixture then contacted with a solvent having a lower solubility ratio for the esters, for example, 12 parts of dimethyl isophthalate to 1 part dimethyl terephthalate. Just sufficient solvent to dissolve the 4 parts of dimethyl terephthalate, taking with it 4×12 or 48 parts of dimethyl isophthalate, is employed. This leaves 24 parts of dimethyl isophthalate undissolved which are then withdrawn in substantially pure form. As a final step, the solvent is then removed from the solution and the solid residue containing 48 parts of dimethyl isophthalate and 4 parts of dimethyl terephthalate recycled as mentioned above.

In the above descriptions of my invention a solvent having a relatively high solubility ratio for the isophthalate over the terephthalate was employed in the first extraction. When, however, the starting mixture contains a ratio of isophthalate to terephthalate equal to or higher than the solubility ratio of the initial solvent, it is desirable to reverse the order of sequence and use the lower solubility ratio solvent in the first extraction in amounts just sufficient to dissolve all of the terephthalate in the starting mixture.

Any mixtures of the lower aliphatic alcohol diesters of isophthalic acid and terephthalic acid may be separated by the dual solvent extraction process of my invention. Mixtures consisting predominantly of isophthalate are commonly utilized since isophthalic and terephthalic acids are currently being produced by the oxidation of isomeric xylene mixtures. Since meta-xylene predominates in xylene mixtures derived from sources such as coal tar and petroleum hydrocarbons, it is obvious that the phthalic acids from them will consist mainly of isophthalic acid.

As solvents in the dual solvent extraction process of my invention, any two different solvents capable of dissolving different ratios of the isophthalate and terephthalate may be employed. Desirably, the solvents should be selected to give a combination in which one solvent is characterized by a high solubility ratio for isophthalate to terephthalate of, for example, 16:1 or higher, and the other by a lower solubility ratio for isophthalate to terephthalate as, for example, 15:1 or lower. For practical purposes the best solvents are those which, in addition to the foregoing characteristics, are readily and economically available and are characterized by low boiling points which facilitate their removal from the dissolved mixtures of phthalates by conventional means such as evaporation, distillation, etc. Benzene and acetone are illustrative of the preferred solvents having a high solubility ratio since they dissolve dimethyl isophthalate and dimethyl terephthalate in the ratio of 20.0:1 and 19.5:1, respectively. They are, in addition, commonly available and distill readily at moderately low temperatures. Other solvents including isopropyl alcohol and carbon tetrachloride also possess similarly desirable characteristics and are suitable for my process.

The solvents of lower solubility ratio suitable for use in the dual solvent separation process of my invention, for example, are ethyl alcohol, ethyl acetate, methyl alcohol, methyl acetate, acetic anhydride, toluene, xylene, dimethyl ortho-phthalate, and isopentane, all of which have a solubility ratio for isophthalate over terephthalate of less than 15:1. Ethyl alcohol (190 proof) and methyl acetate are preferred for their ready availability.

The following table shows the solubility ratios of several illustrative solvents for dimethyl isophthalate over dimethyl terephthalate at 20° C.

| Solvent: | Solubility ratio iso/tere |
|---|---|
| Isopentane | 11.3/1 |
| Carbon tetrachloride | 17.5/1 |
| Acetone | 20.0/1 |
| Acetic anhydride | 10.0/1 |
| Methanol | 13.9/1 |

| | |
|---|---|
| Ethanol (190 proof) | 12.8/1 |
| Isopropanol | 19.2/1 |
| Ethyl acetate | 14.2/1 |
| Dimethyl o-phthalate | 6.7/1 |
| Benzene | 19.5/1 |
| Toluene | 13.8/1 |
| Xylene | 12.0/1 |

As already indicated, the dual solvent extraction may be carried out in various orders of sequence depending upon the isomeric mixture to be separated and the nature of the solvents employed, all of which will be apparent to those skilled in the art from the preceding paragraphs. The process may be conducted either in batch fashion or in a continuous manner. The pure undissolved isophthalate and terephthalate residues may be recovered by various means such as filtration, decanting, etc. The solvents may be removed from the dissolved isomeric mixtures by simple procedures such as evaporation, distillation, etc. The extractions may be carried out at any suitable pressure and temperature, it being only necessary that the temperature be maintained below the melting points of both the isophthalate and terephthalate or their eutectic, which, in the case of dimethyl isophthalate and dimethyl terephthalate, is about 61.2° C. Although changes in the temperatures at which the separations are carried out will usually increase or decrease the solubility of the phthalate isomers, variations in temperature have little or no effect on the solubility ratios of the solvents.

The amount of solvent necessary to entirely dissolve either the isophthalate or terephthalate is readily determined by taking the pure isophthalate and terephthalate separately and noting the extent to which they are soluble in the particular solvent at the particular temperature to be employed in the separation. In the case of benzene, 72.0 grams of dimethyl isophthalate will be dissolved at room temperature of about 20° C. for every 100 grams of benzene, while acetone, for example, will dissolve 89.0 grams of dimethyl isophthalate per 100 grams. Having once determined the solubility of the particular isomer in the solvent employed, it is then only necessary to analyze a sample of the isomeric mixture to be separated to determine the relative proportions of the isomers and the amount of solvent required to completely dissolve the desired isomer.

The following example is illustrative of the process of my invention, but is not to be construed in limitation thereof.

*Example*

Forty-seven parts by weight of an isomeric phthalate mixture analyzing 74.5% by weight of dimethyl isophthalate and 25.5% by weight of dimethyl terephthalate by ultraviolet analysis were ground to a fine powder. Fifty-four parts by weight of benzene, a 10% excess over the amount necessary to entirely dissolve the dimethyl isophthalate present, were added and the mixture was allowed to stand at room temperature for a few hours. The mixture was then cooled at 20° C. and filtered and the filter cake was washed with 2 portions of benzene, each amounting to about 6 parts by weight. The filter cake, consisting of dimethyl terephthalate, was then dried at 90° C. under a vacuum for about 3 hours. About 5.7 parts by weight of product was then obtained having a melting point of 140.0–140.2° C., comparing with 140° C. for terephthalate noted from the literature. The product represents a recovery of about 47.5% of the dimethyl terephthalate in the original charge.

The filtrate from the above extraction was next evaporated until no benzene odor remained. About 29.3 parts by weight of the residue thus obtained were then contacted with about 160 parts by weight of ethyl alcohol (190 proof), an excess of 10% over the amount necessary to entirely dissolve the dimethyl terephthalate present, and the mixture cooled to about 20° C. About 10 parts by weight of dimethyl isophthalate remained undissolved. The mixture was filtered and the residue washed with 20 parts by weight of the ethyl alcohol. The crystals were than dried at 40° C. for 3 hours to give 7 parts by weight of a dimethyl isophthalate product having a melting point of 66.8–67° C., compared to 67–68° C. for dimethyl isophthalate referred to in the literature. This represents a recovery of about 20% of the original dimethyl isophthalate.

The use of acetone and xylene as additional solvents in the separation of dimethyl isophthalate and dimethyl terephthalate according to the process of my invention as outlined above may be illustrated by the following example.

One hundred grams of a mixture containing 80 grams of dimethyl isophthalate and 20 grams of dimethyl terephthalate is ground to a fine powder. Ninety grams of acetone are added to the powder with thorough mixing. The mixture is cooled to 20° C. and filtered. The dry filter cake consists of 17 grams of almost pure dimethyl terephthalate amounting to a recovery of about 80% of the terephthalate in the starting mixture.

The filtrate from the above is evaporated to dryness. The residue, containing 80 grams of isophthalate and 4 grams of the terephthalate is treated with 152 grams of xylene. After thorough agitation the mixture is cooled to 20° C. and filtered. The dry filter cake consists of 32 grams of almost pure dimethyl isophthalate. This is a 40% yield of the isophthalate in the original mixture.

It will be noted in the above examples that substantial recoveries of the dimethyl isophthalate and dimethyl terephthalate are obtained in single steps of the dual solvent extraction processes according to my invention. These recoveries of course are greatly augmented by recycling the residues to repeat the separation steps.

Obviously, many modifications and variations of the above invention may be made without departing from the spirit and scope thereof. All such modifications and variations as are included in the scope of the following claims are contemplated by my invention.

This application is a continuation-in-part of my copending U. S. patent application Serial No. 206,319, filed January 16, 1951, now Patent No. 2,656,377.

I claim:

1. A process of separating mixtures of lower alkyl alcohol di-esters of isophthalic acid and terephthalic acid, which comprises contacting said mixtures successively with two solvents having different solubility ratios for the isophthalate over the terephthalate, the mixtures being first contacted with acetone in an amount just sufficient to entirely dissolve the more highly soluble isophthalate, withdrawing the undissolved terephthalate in a nearly pure state, removing the acetone from the dissolved mixture of isophthalate and terephthalate, the residual mixture thus obtained being then contacted with a solvent selected from the group consisting of toluene and xylene in an amount just sufficient to entirely dissolve the terephthalate and the undissolved excess of isophthalate being withdrawn in a nearly pure state, the foregoing order of sequence in contacting the mixture with the solvents being reversed when the ratio of isophthalate to terephthalate in the starting mixture is greater than 20 to 1, removing the solvent from the dissolved mixture and recycling the residual mixture thus obtained to repeat the foregoing steps.

2. A process of separating mixtures of lower alkyl alcohol di-esters of isophthalic acid and terephthalic acid with each other in which the ratio of isophthalate to terephthalate is less than 20 to 1, which comprises contacting said mixtures with acetone in an amount just sufficient to entirely dissolve the more highly soluble isophthalate, and withdrawing the undissolved terephthalate in a nearly pure state.

3. A process of separating mixtures of lower alkyl alcohol di-esters of isophthalic acid and terephthalic acid with each other in which the ratio of isophthalate to terephthalate is greater than 20 to 1, which comprises contacting said mixtures with a solvent selected from the group consisting of toluene and xylene, the amount of solvent being just sufficient to entirely dissolve the terephthalate, and withdrawing the undissolved isophthalate in a nearly pure state.

4. A process of separating mixtures of dimethyl isophthalate and dimethyl terephthalate which comprises first contacting said mixtures with acetone in an amount just sufficient to entirely dissolve the dimethyl isophthalate, withdrawing the undissolved dimethyl terephthalate in a nearly pure state, removing the acetone from the dissolved mixture of dimethyl isophthalate and dimethyl terephthalate, then contacting the residual mixture with xylene in an amount just sufficient to entirely dissolve the dimethyl terephthalate, withdrawing the undissolved dimethyl isophthalate in a nearly pure state, the foregoing order of sequence in contacting the mixtures with the solvents being reversed when the ratio of isophthalate to terephthalate in the starting mixture is greater than 20 to 1, removing the solvent from the dissolved mixture and recycling the residual mixture thus obtained to repeat the foregoing steps.

5. A process of separating mixtures of dimethyl isophthalate and dimethyl terephthalate wherein the ratio of dimethyl isophthalate to dimethyl terephthalate is less than 20 to 1, which comprises contacting said mixtures with an amount of acetone just sufficient to entirely dissolve the dimethyl isophthalate, withdrawing the undissolved dimethyl terephthalate in a nearly pure state, evaporating the acetone from the dissolved mixture of dimethyl isophthalate and dimethyl terephthalate, contacting the residual mixture thus obtained with an amount of xylene just sufficient to entirely dissolve the dimethyl terephthalate, withdrawing the undissolved dimethyl isophthalate in a nearly pure state, removing the xylene from the dissolved mixture and recycling the residual mixture thus obtained to repeat the foregoing steps.

6. A process of separating mixtures of dimethyl isophthalate and dimethyl terephthalate wherein the ratio of dimethyl isophthalate to dimethyl terephthalate is greater than 20 to 1, which comprises contacting said mixtures with an amount of xylene just sufficient to entirely dissolved the dimethyl terephthalate, withdrawing the undissolved dimethyl isophthalate in a nearly pure state, evaporating the xylene from the dissolved mixture of dimethyl isophthalate and dimethyl terephthalate, contacting the residual mixture thus obtained with an amount of acetone just sufficient to entirely dissolved the dimethyl isophthalate, withdrawing the undissolved dimethyl terephthalate in a nearly pure state, removing the acetone from the dissolved mixture and recycling the residual mixture thus obtained to repeat the foregoing steps.

7. A process of separating mixtures of lower alkyl alcohol diesters of isophthalic acid and terephthalic acid with each other which comprises contacting the mixtures with a solvent, said solvent being acetone when the ratio of isophthalate to terephthalate is less than 20 to 1 and said solvent being selected from the group consisting of toluene and xylene when the ratio of isophthalate to terephthalate is greater than 20 to 1, the amount of solvent in the first case being just sufficient to entirely dissolve the isophthalate and, in the second case, just sufficient to entirely dissolve the terephthalate, and withdrawing the undissolved phthalate in a nearly pure state.

No references cited.